US006485038B1

(12) United States Patent
Garrard

(10) Patent No.: US 6,485,038 B1
(45) Date of Patent: Nov. 26, 2002

(54) VEHICLE WHEEL ANGLE ADJUSTING APPARATUS

(75) Inventor: James H. Garrard, Boulder, CO (US)

(73) Assignee: Ingalls Engineering Company, Inc., Louisville, CO (US)

( * ) Notice: Subject to any disclaimer, the term of this patent is extended or adjusted under 35 U.S.C. 154(b) by 0 days.

(21) Appl. No.: 09/919,289

(22) Filed: Jul. 31, 2001

Related U.S. Application Data

(63) Continuation-in-part of application No. 09/703,780, filed on Oct. 31, 2000.

(51) Int. Cl.⁷ .............................................. B62D 17/00
(52) U.S. Cl. ............................. 280/86.75; 280/867.51; 280/86.754
(58) Field of Search ......................... 280/86.75, 86.751, 280/86.752, 86.754, 86.756, 93.512, 124.127, 124.134

(56) References Cited

U.S. PATENT DOCUMENTS

| | | | |
|---|---|---|---|
| 2,991,087 A | * 7/1961 | Stanis | ........................ 280/96.2 |
| 4,226,440 A | * 10/1980 | Chappell et al. | ............. 280/660 |
| 4,921,271 A | 5/1990 | Berry et al. | |
| 4,970,801 A | * 11/1990 | Specktor et al. | ............... 33/600 |
| 5,697,632 A | 12/1997 | Burman et al. | |
| 6,224,075 B1 | 5/2001 | McIntyre | |
| 6,293,724 B1 | * 9/2001 | Spears et al. | ............... 403/122 |
| 6,382,645 B1 | * 5/2002 | Gravelle et al. | ....... 280/86.754 |

OTHER PUBLICATIONS

Specialty Products Company; Honda/Acura Adjustable Ball Joint: Publication date unknown (Product Advertisement).
Northstar Manufacturing; Xtrarange Adjustable Alignment Products for Lowered Vehicles: Publication date unknown; (Product Advertisement).
2000–2001 Total Wheel Alignment Sourcebook: Specialty Products Company; p. 51; Publication Date Unknown; Product Catalogue.
1998–1999 Alignment Products Catalogue; Northstar Manufacturing Company, Inc.; p. 74; Publication Date unknown.

* cited by examiner

Primary Examiner—Daniel G. DePumpo
Assistant Examiner—Tony Winner
(74) Attorney, Agent, or Firm—Harold A. Burdick

(57) ABSTRACT

Replacement ball joint apparatus and methods for conveniently modifying motor vehicle suspension camber, caster or camber/caster combination angle by means of repositioning a wheel spindle top or bottom relative to a control arm. The apparatus includes a module securing one end of a ball joint which is connectable at its other end to the spindle, the module having guide slots at an upper surface thereof and a threaded bore therein. An insert is securable at the control arm and has an elongated slot through which a bolt is received and engageable at the threaded bore in the module. Protruding guides are defined at a surface of the insert, the guides and guide slots being engageble for maintenance of module orientation.

17 Claims, 9 Drawing Sheets

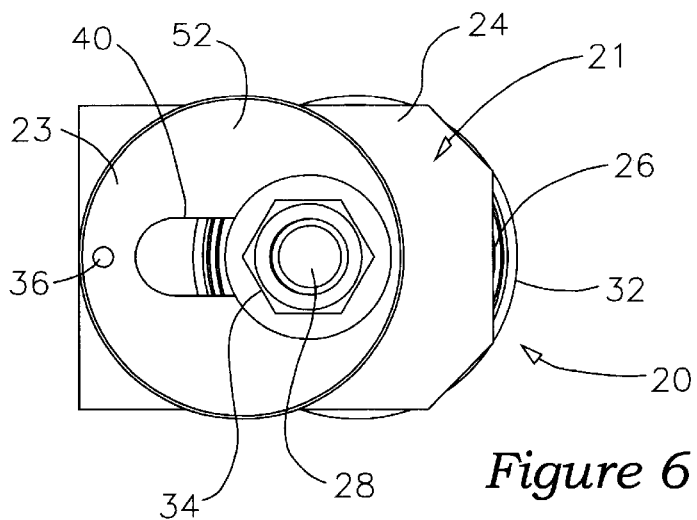
Figure 6
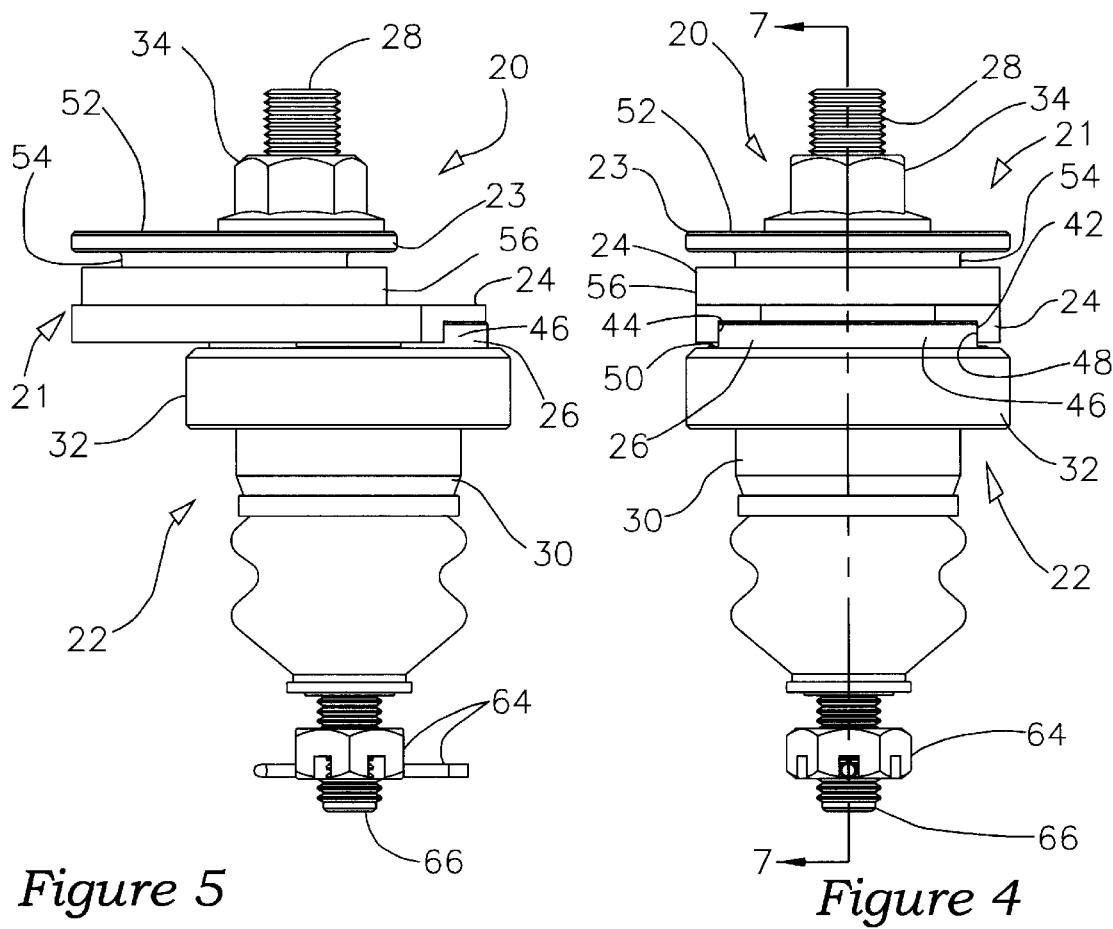
Figure 5
Figure 4

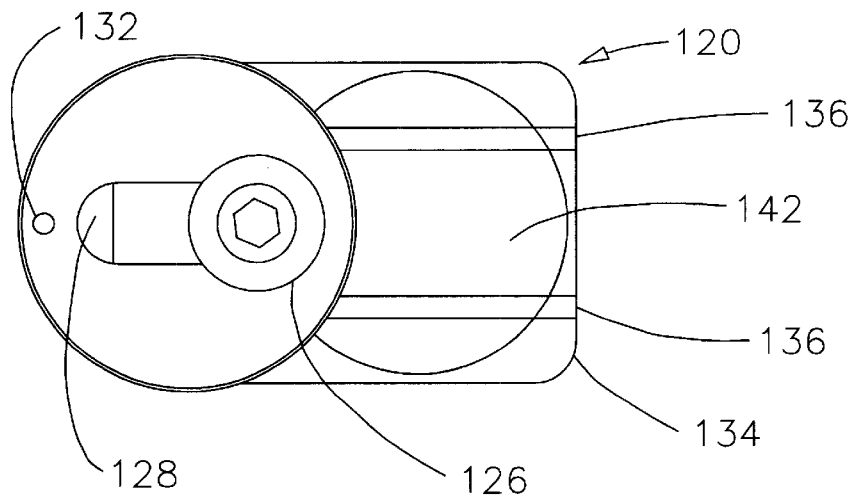
Figure 13
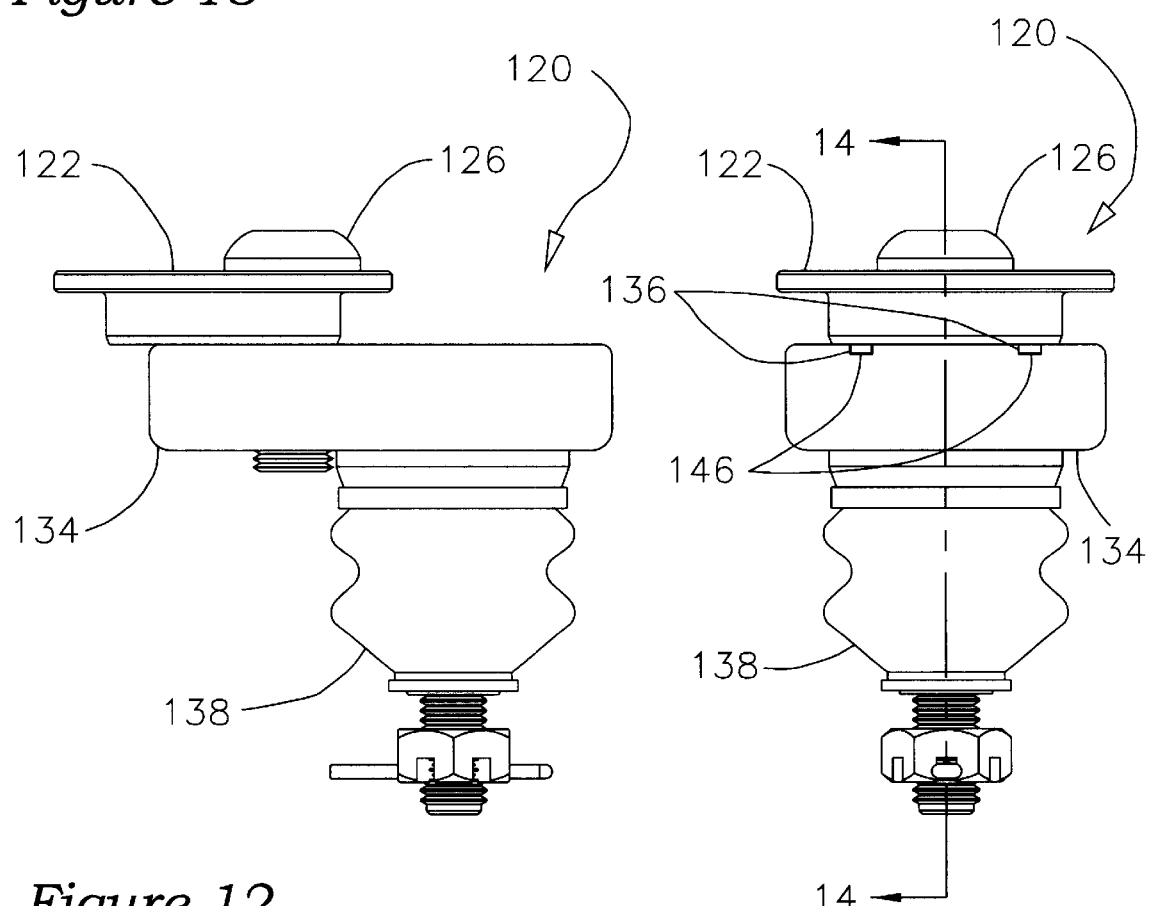
Figure 12
Figure 11

VEHICLE WHEEL ANGLE ADJUSTING APPARATUS

RELATED APPLICATION

This application is a Continuation-In-Part of pending U.S. patent application Ser. No. 09/703,780 filed on Oct. 31, 2000 by Robert M. Allman and James H. Garrard and entitled "APPARATUS AND METHOD PROVIDING ADJUSTABLE VEHICLE BALL JOINT POSITIONING".

FIELD OF THE INVENTION

This invention relates to wheel adjustment/alignment apparatus and methods for vehicles, and, more particularly, relates to apparatus and methods for adjusting the control arm/wheel spindle relationship at an upper or lower ball joint connection to produce changes in the camber, caster or camber/caster combination angle of a vehicle wheel.

BACKGROUND OF THE INVENTION

Most vehicles consist of a tire/wheel mounted to a spindle which is attached to the vehicle through upper and lower control arms with the main connection being through ball joints mounted to the control arms. Some vehicles, however, are manufactured without provision for adjusting camber angle in the wheels. For example, some vehicles utilize an 'A' shaped upper control arm with 'silent-bloc' type pivot isolators pressed into the inner pivot locations of the arm. The inner control arm in some such cases has a 'u' shaped bracket welded into it, with cross-holes in the inner bracket and inner control arm for locating the mounting bolts that engage and clamp the 'silent-bloc' pivot isolators. This arrangement locates the inner pivots of the upper control arm in a fixed position with no means of adjustment.

The camber and caster angles of the tire/wheel (relative to the vehicle frame) directly effect vehicle handling and tire wear and is therefore of great importance. Camber angle is typically specified by the factory at a specific vehicle ride height (the distance from the ground to some point in the vehicle suspension corresponding to the vehicle frame center of gravity). The camber angle established between the plane of the tire and wheel and the vertical plane through the vehicle frame is directly impacted by any changes in the suspension components. Such changes can occur through damage to the components or through modification, intentional or unintentional, to the vehicle ride height. Thus, vehicles with raised or lowered ride height or damaged suspension links will typically not maintain proper camber angle and require means for readjusting the camber angle to the original specifications if handling and tire longevity are not to be sacrificed. Moreover, it may become desirable to correct a mis-aligned vehicle with other than strictly camber corrections.

One current means for adjusting camber angle consists of changing the relative position of the control arm to the vehicle at the body mounting points. This allows the control arm, and thus the ball joint position, to be moved laterally with respect to the vehicle, thereby changing the camber angle of the spindle and the tire/wheel. This method will not work if the vehicle's control arm mounting scheme prevents replacing the fixed control arm body mounts with an adjustable mounting apparatus.

Another current means for adjusting camber angle provides for replacement of the upper or lower ball joint with an offset ball joint that, when rotated, allows changes of the position of the spindle mounting point around an offset arc. While this enables the camber angle to be modified, it at the same time modifies the caster angle, sometimes undesirably, due to its fixed radial offset arc.

In most vehicles, there is sufficient room for the suspension to translate up and down, as road conditions require, without contacting any parts of the vehicle body in the wheel well. However, when a vehicle's ride height has been modified lower there is less room for suspension travel. To allow for necessary corrections to camber angle in such cases, adjustable replacement devices must not require excessive room or unduly raise the control arm relative to the wheel thereby reducing the amount of vertical clearance in the wheel well and thus further limit the ability for the suspension to translate without contacting the vehicle body in the wheel well. A means of providing significant camber angle adjustment with minimal vertical height addition would thus be desirable. Further improvements could therefore be utilized.

SUMMARY OF THE INVENTION

This invention provides apparatus for selective positioning of a vehicle ball joint relative to a control arm to provide adjustability of wheel camber, wheel caster, and/or a combination of wheel camber and caster. The apparatus is simple to install and adjust, requires no modification of other suspension components, provides for adjustment of wheel camber independent of caster adjustment, and utilizes a minimal amount of space.

The apparatus includes a module configured to secure an end of the ball joint. A threaded bore and an orientation guide are defined at one surface of the module. An insert is securable at the control arm and has a mating orientation guide structure at one surface thereof engageable with the orientation guide of the module. A threaded stud is mounted through the slot of the insert and engages the threaded bore of the module, the stud movable linearly in the insert slot.

A ball joint is retained at a cavity through one surface of a body of the module and adjacent to the threaded bore. A cover secures the ball joint at the cavity, one surface of the body and the cover defining the orientation guide. The ball joint is affixable at an end protruding from the body to the vehicle's wheel spindle.

The mating orientation guide structure of the insert is preferable protruding guide pins, and the orientation guide of the module preferably mating slots. The insert is held at the control arm with a selected alignment of the slot relative to the control arm. The ball joint is fit into the cavity of the body of the module with the cover secured thereover at the body, the guide slots of the body/cover of the module and the protruding guides of the insert being aligned. The stud is located at a selected location linearly in the elongated slot of the insert before being tightened in the threaded bore.

It is therefore an object of this invention to provide apparatus for selective positioning of a vehicle ball joint relative to a control arm to provide adjustability of wheel camber, wheel caster, and/or a combination of wheel camber and caster.

It is another object of this invention to provide an apparatus for selective vehicle wheel angle positioning that is simple to install and adjust on a vehicle, requires no modification of other suspension components, provides for adjustment of wheel camber independent of caster adjustment, and utilizes a minimal amount of space.

It is still another object of this invention to provide an apparatus for selective positioning of a vehicle ball joint securable between a control arm and a wheel mounting, the apparatus including a module configured to secure an end of the ball joint and including a threaded bore thereat and an orientation guide at one surface thereof, an insert securable at the control arm and having a mating orientation guide structure at one surface thereof engageable at the orientation guide of the module for rotationally stabilizing the module thereat, the insert having a slot therethrough, and a threaded stud mountable through the slot of the insert and engageable by the threaded bore of the module, the stud movable linearly at the slot of the insert.

It is yet another object of this invention to provide an apparatus mountable at a vehicle control arm opening and at a spindle to provide selectable camber correction of a vehicle wheel that includes an insert having a slot, the insert extendible through the control arm opening and having an orientation guide structure at one surface thereof, a ball joint retaining module including a body and a cover, one surface of the body and the cover defining an orientation guide receivable at the orientation guide structure of the insert, the body having a cavity therein through the one surface that is secured by the cover, a ball joint affixable at one end to the spindle and at another end in the cavity in the body of the module, and a stud engageable at a selected position through the slot of the insert with the ball joint retaining module.

It is yet another object of this invention to provide an apparatus providing camber angle adjustability of a vehicle wheel that includes an insert having protruding guides and an elongated slot therethrough, a ball joint module including a ball joint, a body with a threaded bore adjacent to a cavity, and a cover, at least the cover having guide slots thereat, and a bolt engageable through the slot of the insert and at the threaded bore of the body of the module, wherein the insert is held at a vehicle suspension control arm member with a selected alignment of the slot relative to the control arm member, the ball joint is fit into the cavity of the body of the module with the cover secured thereover at the body, the guide slots of the cover of the module and the protruding guides of the insert are aligned, and the bolt is located at a selected location linearly in the elongated slot of the insert before being tightened in the threaded bore.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 4 is a front elevation view of the apparatus of FIG. 3;

FIG. 5 is a side elevation view of the apparatus of FIG. 3;

FIG. 6 is a top elevation view of the apparatus of FIG. 3;

FIG. 11 is a front elevation view of the apparatus of FIG. 10;

FIG. 12 is a side elevation view of the apparatus of FIG. 10;

FIG. 13 is a top elevation view of the apparatus of FIG. 3;

DESCRIPTION OF THE INVENTION

Figure 1:
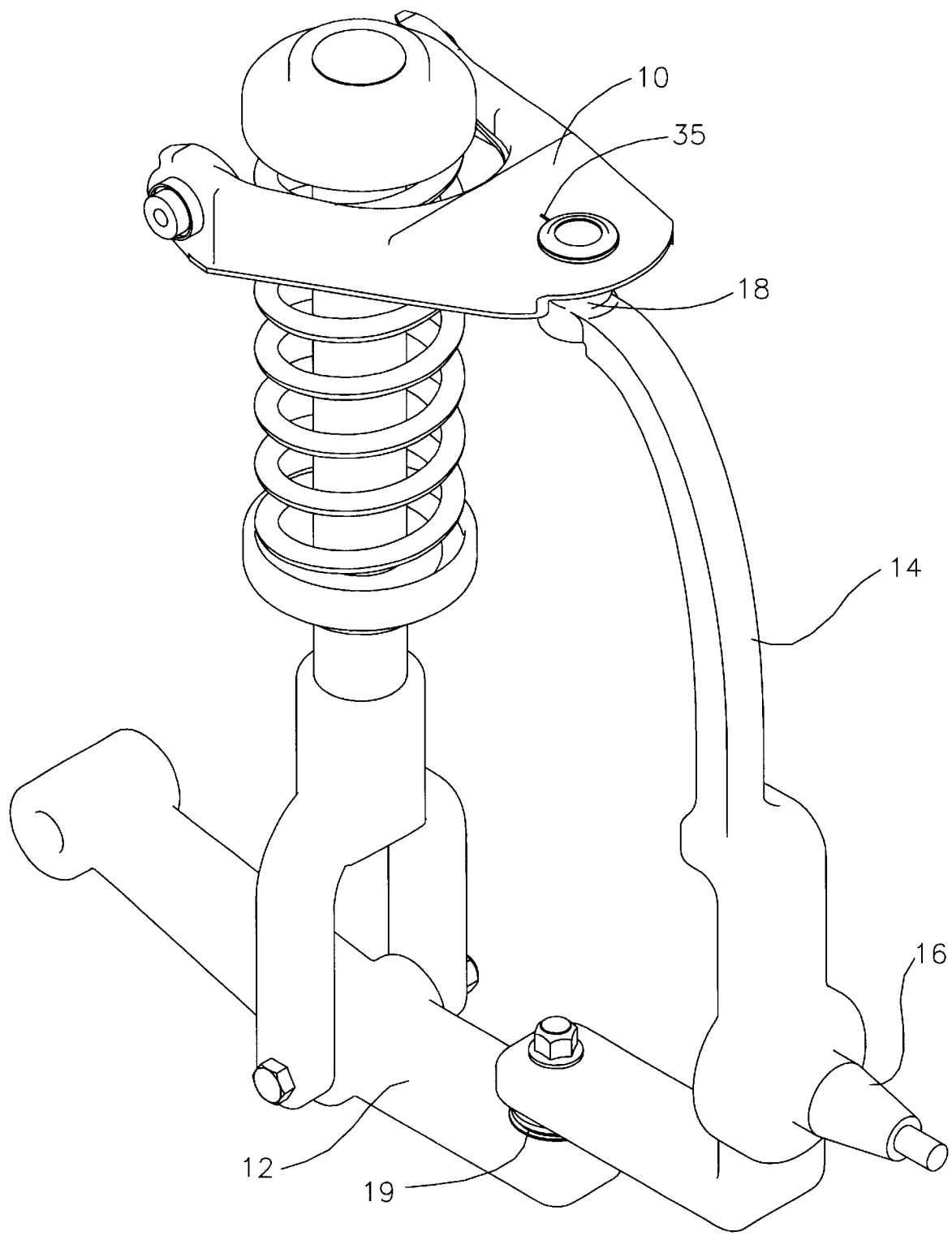
FIG. 1 illustrates one typical suspension system on a vehicle as supplied by a manufacturer.

FIG. 1 illustrates a typical suspension system on a vehicle as supplied by the manufacturer. Upper control arm 10 and lower control arm 12 are both attached to the vehicle frame (not shown). Spindle 14, which includes wheel mount 16 for supporting a wheel with a tire mounted thereon (not shown), is pivotably attached to each control arm through upper ball joint 18 and lower ball joint 19, the ball joints spaced a fixed distance apart by spindle 14.

Figure 2:
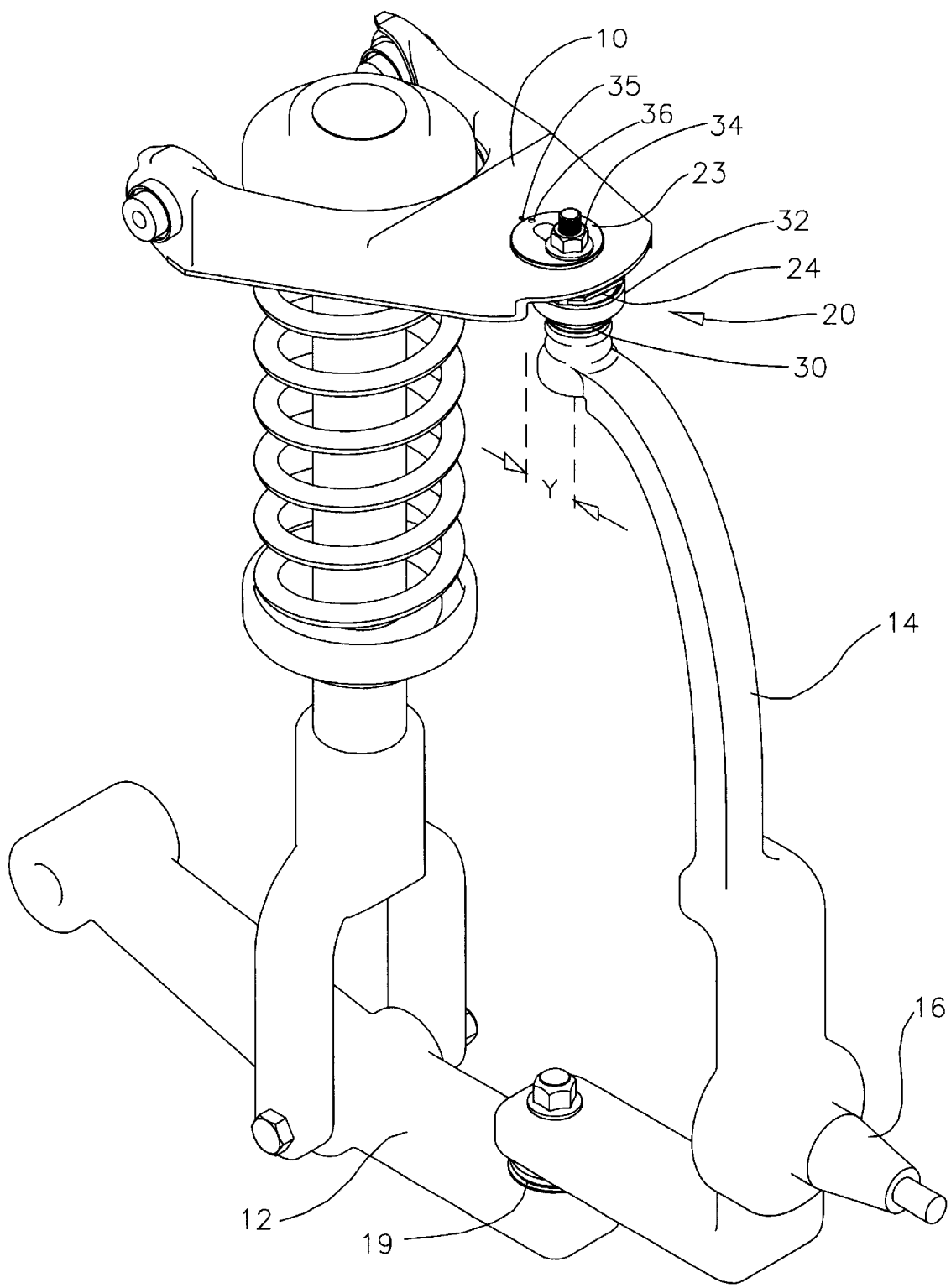
FIG. 2 illustrates the suspension system of FIG. 1 with a first embodiment of the apparatus of this invention installed.
Figures 3, 7:
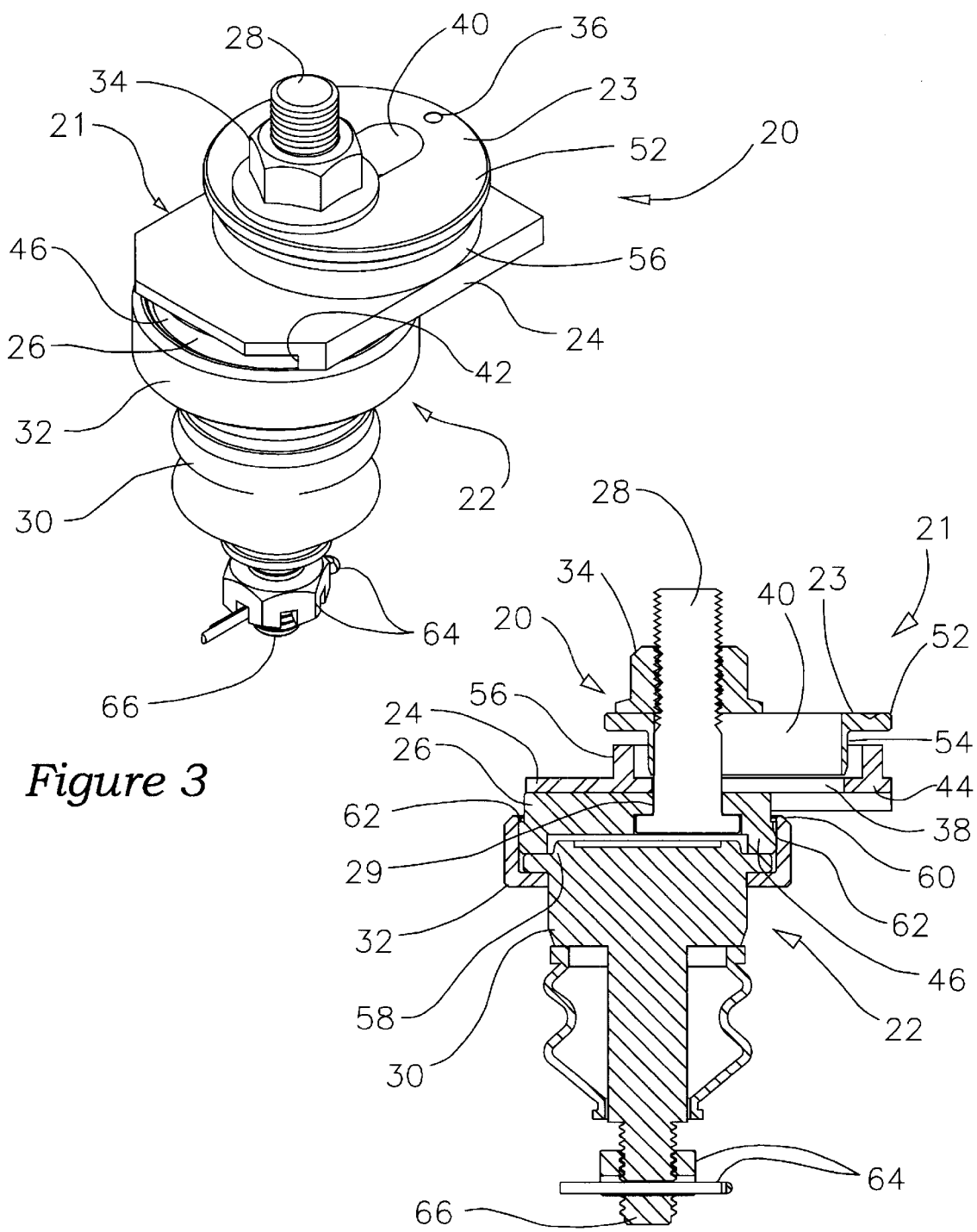
FIG. 3 is a perspective view of the camber/caster adjusting apparatus of FIG. 2.
FIG. 7 is a sectional view taken along section line 7—7 of FIG. 4.

FIG. 2 shows the suspension of FIG. 1 with a first embodiment of the camber/caster adjusting apparatus of this invention replacing the factory ball joint 18 for selective translation of the position of the upper ball joint along a linear distance "Y", either inward towards the vehicle frame or outward away from the vehicle frame. When set as illustrated and discussed in greater detail hereinbelow, the effect of movement in the "Y" direction will be to decrease or increase, respectively, the camber angle established by the plane of the tire and wheel with the vertical plane of the vehicle frame in the direction from front to back of the vehicle. While use with the upper ball joint is illustrated herein, the apparatus could be applied to replace lower ball joint 19 and/or applied at both locations.

Camber/caster adjusting apparatus 20, as shown in FIGS. 3 through 8, includes guide assembly 21 and mount assembly 22. Guide assembly 21 includes insert 23 and guide plate 24 maintained at opposite sides of control arm opening 25 (see FIG. 8). Mount assembly 22 includes slide 26 having offset stud 28 extending therefrom through opening 29. Ball joint 30 is held at slide 26 by collar 32. The apparatus is held in relative positions, as discussed hereinafter, by fastener 34 (for example a flange nut), ball joint 30 affixable at spindle 14 conventionally.

Insert 23 is pressed into opening 25 of upper control arm 10 (and/or lower control arm 12) in place of the factory supplied ball joint (18 of FIG. 1). For camber only adjustment, insert 23 is oriented along the neutral caster angle by alignment of orientation mark 35 on the control arm (see FIG. 2) and a corresponding dimple or other orientation mark 36 on insert 23. Guide plate 24 and insert 23 each have a slot 38 and 40, respectively, which are substantially coextensive and along which stud 28 is linearly movable. Substantially parallel guide ridges 42 and 44 at guide plate 24 maintain rotational stability and guide linear movement of slide body 46 of slide 26, by guiding engagement adjacent to spaced substantially parallel edges 48 and 50 of slide body 46.

While a particular structure is shown for the guiding and stabilizing interrelationship of guide plate 24 and slide 26, many different configurations at guide plate 24 and mating configuration at slide 26 could be utilized to achieve the same purpose. For example, the guide ridges may be positioned at slide 26 and the matable edges at guide plate 24, or multiple spaced channels or a single centered channel could be provided at either guide plate 24 or slide 26 with corresponding structure at the other configured to ride in the channel or channels.

Insert 23 includes a flange 52 and rim 54, slot 40 defined through rim 54. Rim 54 extends through opening 25 of control arm 10 and is received adjacent to annular extension 56 of guide plate 24. Ball joint 30 is secured at slide 26 by means of a press fit of ball joint end 58 and slide 26 into collar 32 with the addition of a staking process to provide a material deformation of collar end 60 over annular lip 62 of slide 26 to mechanically retain the unit (see FIG. 7). Ball joint 30 may be a factory supplied ball joint and is attached at its other end to spindle 14 using conventional means (applying nut and pin assembly 64 to lower threaded stud 66 after application thereof through opening 67 of spindle 14, for example).

When ball joint 30 is connected to slide 26, it can be seen that the central longitudinal axis of stud 28 is offset relative to the central longitudinal axis of ball joint 30. This offset provides greater extent of wheel angle adjustability, since neutral adjustment, corresponding to alignment of the central axis of ball joint 30 (vertical axis in the FIGURES) with the central axis of opening 25 in control arm 10 (and thus the central axis of insert 23), locates stud 28 near an end slots 38 and 40 of guide plate 24 and insert 23.

Figure 8:
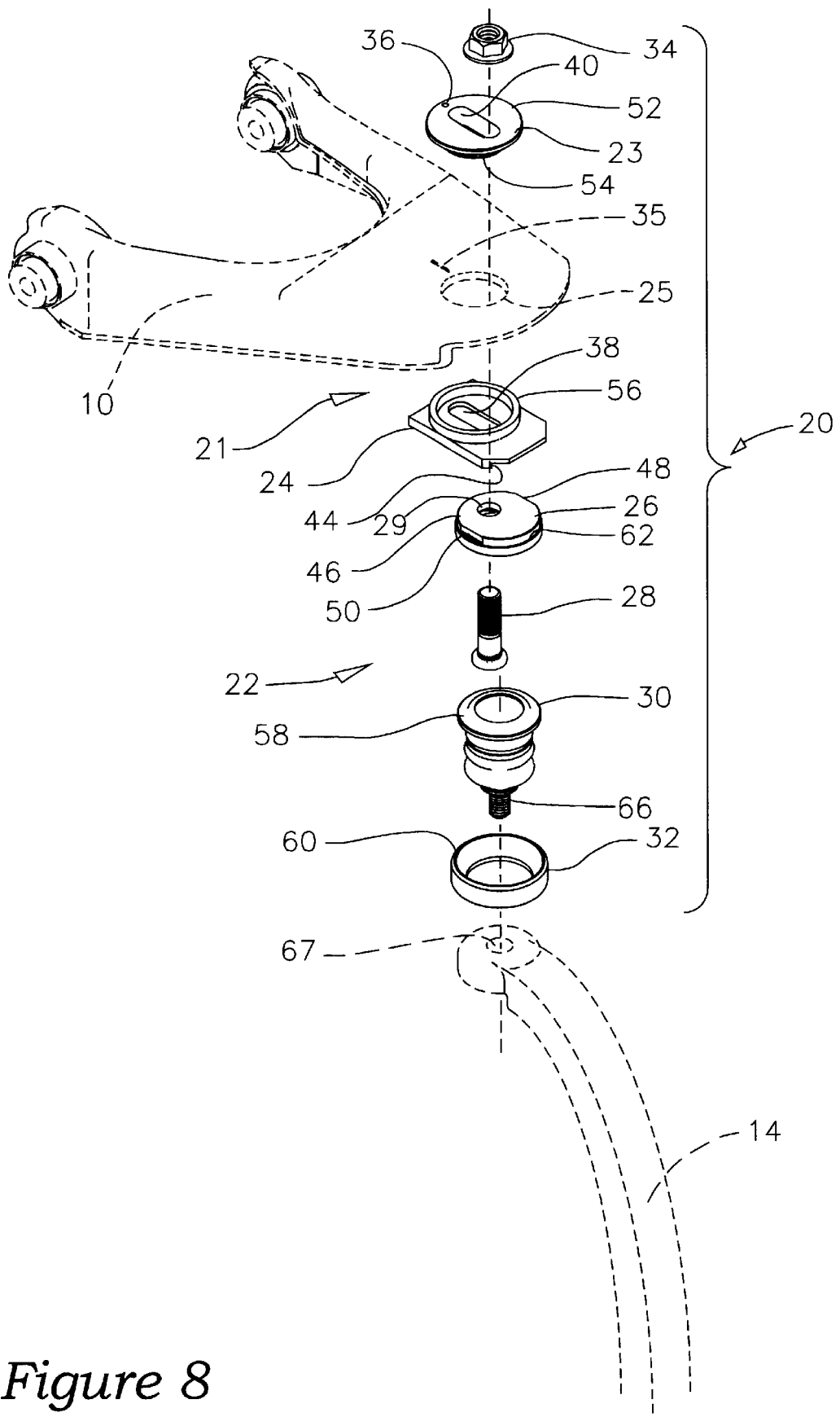
FIG. 8 is an exploded view of the camber/caster adjusting apparatus of FIG. 3.

In use, insert 23 is installed into opening 25 of vehicle suspension control arm 10 (or other selected member) with orientation mark 36 at a selected position to achieve the desired direction of angle adjustability. For example, to allow camber only adjustment, insert 23 should be mounted with marks 35 and 36 aligned as shown in FIGS. 2 and 8 (caster neutral alignment), so that the length of slots 38 and 40 of guide plate 24 and insert 23 are also aligned with the guide marks.

Guide plate 24, with slide 26 thereat having stud 28 extending through slot 38, is positioned at the opposite side of control arm 10. Ball joint 30 may be attached to spindle 14 in advance of or after installation of mount assembly 22 at guide assembly 21 with stud 28 extending through slot 40 of insert 23 (and thus through opening 25 of control arm 10) and held by nut 34. Slide 26, with edges 46 and 48 engaging ridges 42 and 44 of guide plate 24 to stabilize and guide slide 26, when moved in guide plate 24 allows only linear movement of stud 28 in opening 25 perpendicular to the axis of the opening. This sliding movement provides tire/wheel camber adjustment without affecting caster angle (when aligned for caster neutral adjustment as shown in FIG. 2). When the desired angle is achieved (with ball joint 30 and the central axis of opening 25 of control arm 10 in a selected relative position), nut 34 is tightened to retain the interrelationship of the components thus established by securing stud 28 at the selected position relative to the axis of opening 25 and along slots 38/40 and slide 26 at guide plate 24.

Should readjustment be desired, nut 34 may be loosened and mount assembly 22 of apparatus 20 can be moved inward (towards the vehicle frame) or outwards (away from the frame) by moving threaded stud 28 in guide assembly slots 38/40 until the corrected angle is achieved. The position of apparatus 20 is then fixed by applying sufficient torque to flange nut 30.

As may be appreciated, the above described apparatus of this invention could be modified for installation in such a way as to affect only caster angle or in such a way as to affect both caster and camber angles. A geometric relationship exists between the upper and lower wheel spindle connections (ball joints 18 and 19) and the camber and caster angles of the wheel to the vehicle. As previously indicated, altering the position of one of the ball joints in the neutral caster direction affects the camber angle in a desired fashion. Extending this to caster and camber/caster combination corrections and adjustments, the camber/caster adjusting apparatus of this invention can be used to adjust caster only angles or some combination of camber and caster. If so desired, by rotating insert 23 to another position of orientation mark 36 relative to mark 35 on upper control arm 10 during installation, camber/caster adjusting apparatus 20 can be rotated in a predetermined fashion to provide for adjustment of caster only or some combination of camber and caster angles.

For vehicles that, for whatever reason, have less vertical clearances between the wheel well and the upper control arm, a second and, for such applications, now preferred embodiment of this invention is illustrated in FIGS. 9 through 15. The mechanism incorporates the sliding characteristics of the previously illustrated embodiment while increasing the stud to ball joint offset so the stud anchoring function can be moved from over the ball joint to adjacent to it. As will be seen, the result is a significant reduction in vertical height since the large locknut height is replaced by a smaller bolt head (other means could be used to provide thread locking i.e. LOCTITE, nylon patch, or the like) and the stud anchored over the ball joint is now located adjacent to it. This scheme produces the desired effect of greatly reducing the vertical height required and the while providing an adjustment range of between about 1.75 to 4.25 degrees.

Figure 9:
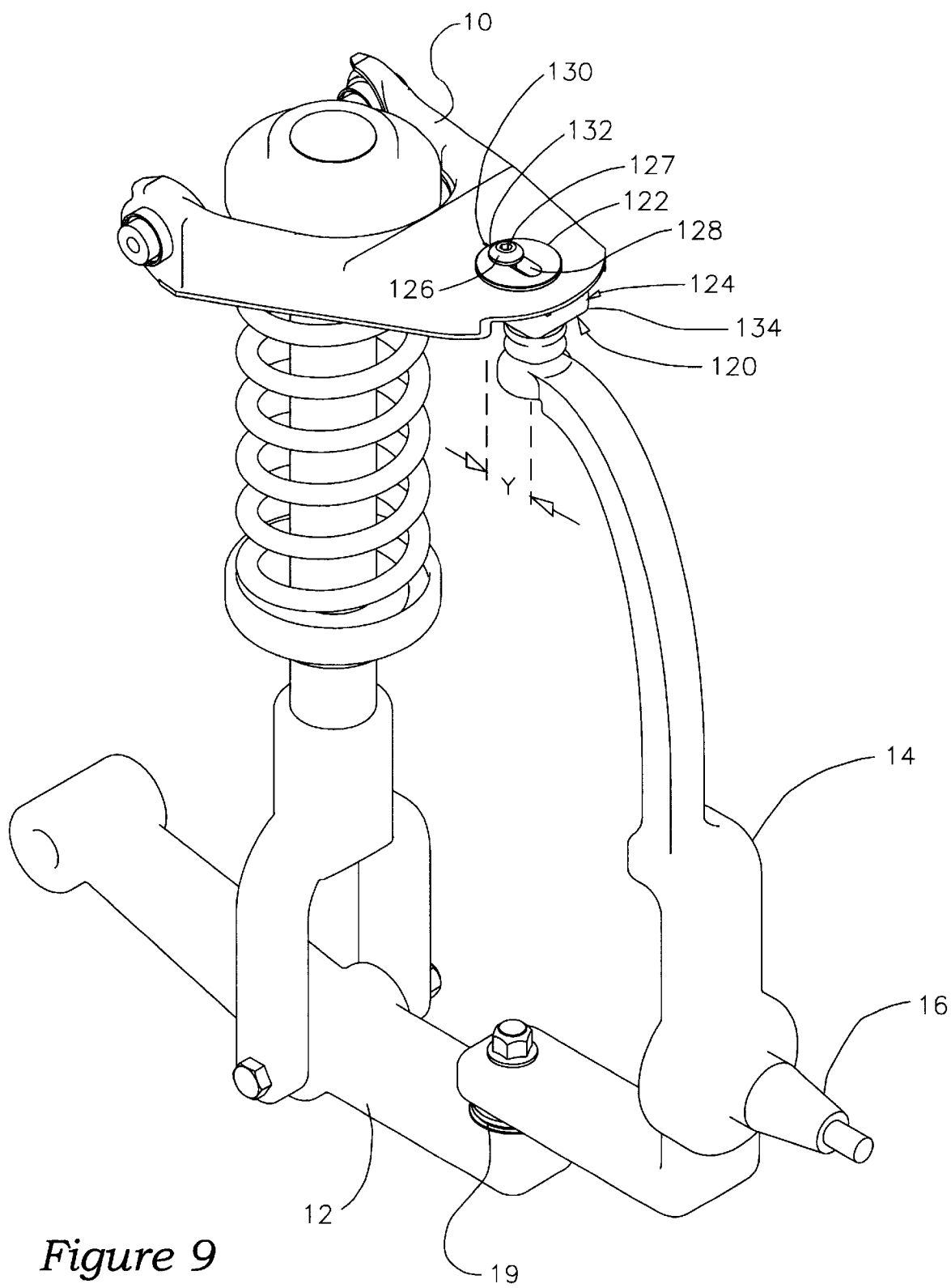
FIG. 9 illustrates the suspension system of FIG. 1 with a second and, for purposes of this application, preferred embodiment of the apparatus of this invention installed.
Figure 10:
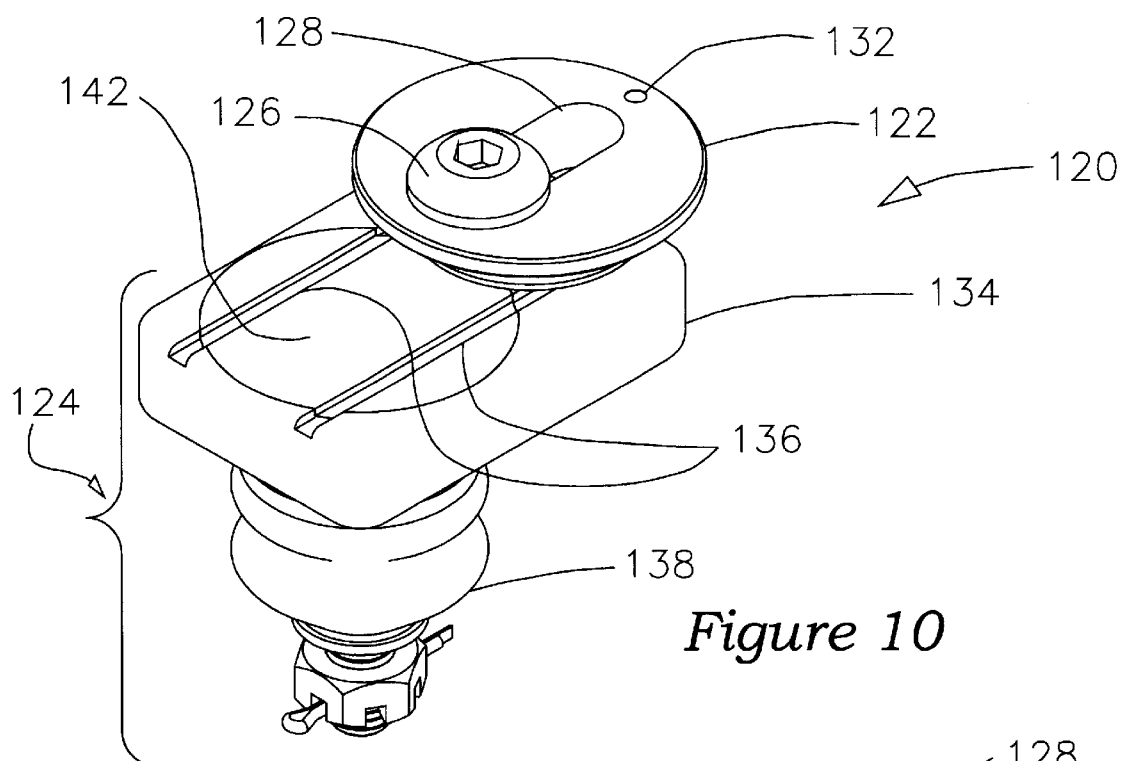
FIG. 10 is a perspective view of the camber/caster adjusting apparatus of FIG. 9.
Figure 14:
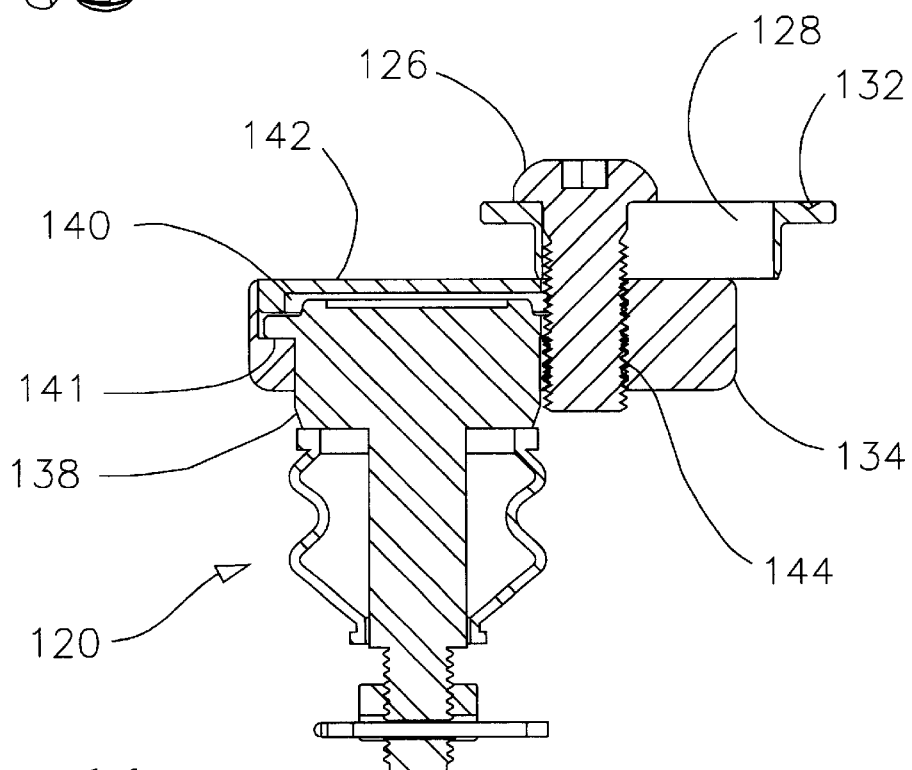
FIG. 14 is a sectional view taken along section line 14—14 of FIG. 11.

FIG. 9 shows the suspension of FIG. 1 wherein wheel angle (especially camber) adjusting apparatus 120 has been added to translate the upper ball joint (18 in FIG. 1) a distance "Y", either inward towards the vehicle frame, or outward away from the vehicle frame. As before, this modification could also apply to the lower ball joint 19.

Details of the construction of adjusting apparatus 120 are shown in FIGS. 10 through 15. Insert 122 (alike in many respects except as noted herein to insert 23 described hereinabove) and ball joint retaining module 124 are secured utilizing threaded stud, or bolt, 126 (preferably having a low profile head 127) extending through elongated slot 128 in insert 122.

Figure 15:
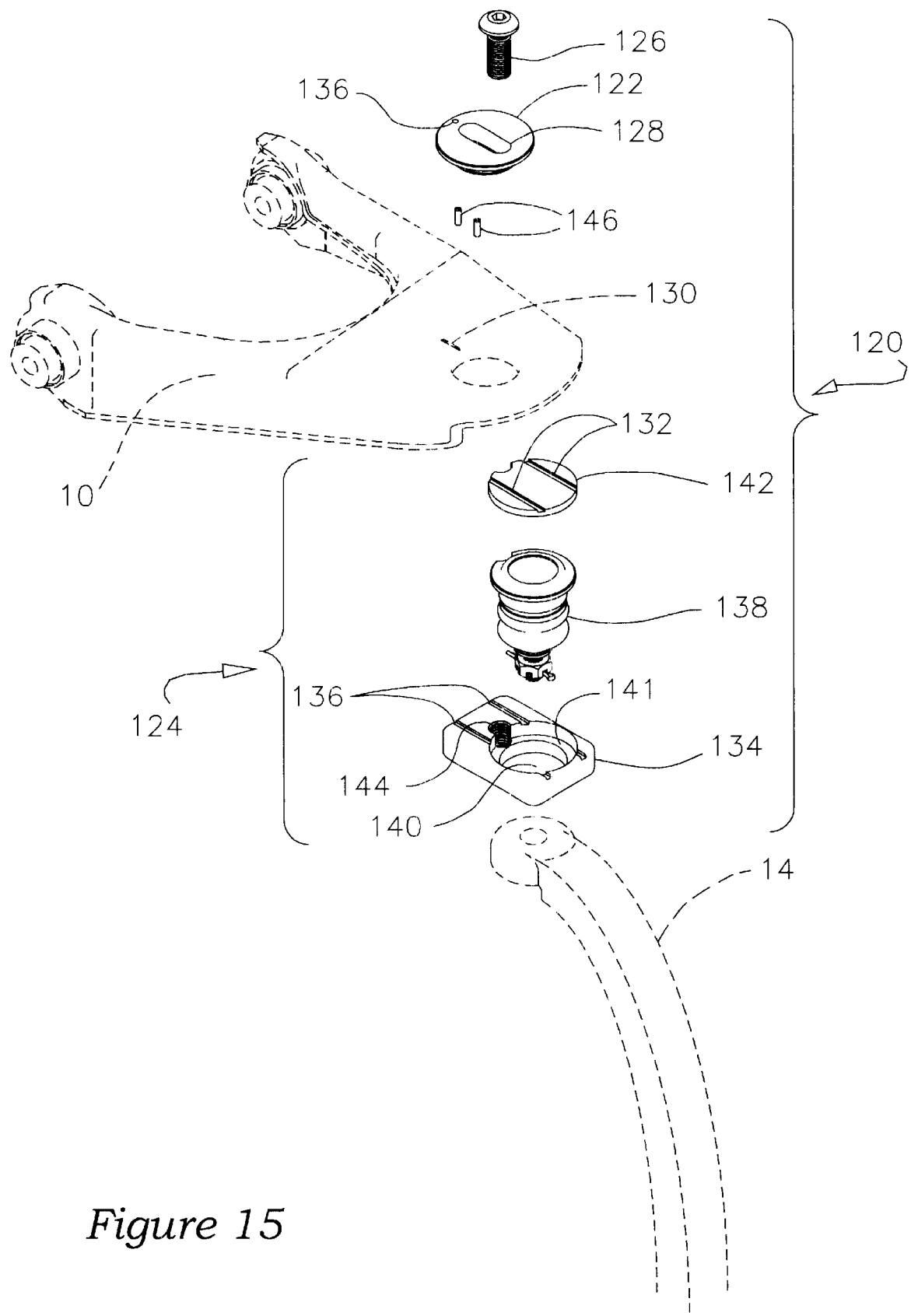
FIG. 15 is an exploded view of the camber/caster adjusting apparatus of FIG. 10.

FIG. 15 shows an exploded view of the camber adjusting apparatus as it is installed in its environment. Insert 122 is pressed into upper control arm 10 (or lower control arm 12 in some cases) in place of the factory supplied ball joint and is oriented, for example, along the neutral caster angle by means of a dimple or similar orientation mark 130 on the control arm and a corresponding dimple or other orientation mark 132 on insert 122. Ball joint module 124 includes body 134 oriented to match slot 128 of insert 122 by virtue of linear orientation guide slots 136 (see FIG. 10) defined at an upper surface thereof. Ball joint module 124 also includes ball joint 138 pressed into cavity 140 in body 134 having a seating rim 141 next to a through opening. Protective cover 142 is installed in the same cavity 140 and includes a portion of guide slots 136 thereat.

A threaded bore 144 overlaps cavity 140 in body 134 (and is also in part defined at an upper segment of ball joint 138 and at cover 142) and accepts the threaded end of bolt 126. Orientation guide pins 146 or similar protrusions are press fit into openings in (or similarly attached to or defined at) the bottom surface of insert 122 and are positioned to mate with the guide slots 136 to maintain component alignment. The entire apparatus is held together by bolt 126 which is placed and positioned through the elongated slot 128 of insert 122, engaged at threaded bore 144 of body 124 and tightened. The ball joint (138) is conventionally attached to spindle 14 as described hereinabove.

Camber angle corrections can be obtained by installing adjusting apparatus 120 at either upper control arm 10 or lower control arm 12. The adjusting apparatus can be moved inward, towards the vehicle frame, or outward, away from the vehicle frame, by moving bolt 126 in insert slot 128 until the correct camber angle is achieved. The position of the adjustment is then secured by applying sufficient torque to bolt 126.

Apparatus 120 is installed by pressing the existing ball joint is out of the upper control arm 10. Insert 122 is then pressed into the top of the upper control arm with the orientation marks on the insert and control arm aligned (for camber only adjustment). Ball joint is placed into the counter bored hole 140 of body 134 with its notch aligned over threaded bore 144 in body 134 and is fully pressed in place. Cover 142 is then installed (press fit, for example) over the ball joint with the portions of guide slots 136 in both cover 142 and body 134 aligned. Orientation guide pins 146 are pressed into holes at insert 122 to the proper depth.

Module 124 is placed on the opposite side (below) the control arm so that pins 146 fit into guide slots 136 and bolt 126 (with LOCTITE added) is inserted through insert slot 128 to threaded bore 144. The stud of ball joint 138 is then attached to the wheel spindle.

It may become desirable to correct a mis-aligned vehicle with other than strictly camber correction. A geometric relationship exists between the upper and lower wheel spindle connections (ball joints) and the camber and caster angles of the wheel to the vehicle. As previously indicated, altering the position of one of the ball joints in the neutral caster direction affects the camber angle in a desirable fashion. Extending this to caster and camber/caster combination directions, the camber adjusting apparatus can be used to adjust caster only angles or some combination of camber and caster.

If other than strictly camber corrections are desired, the angular azimuth orientation between the orientation mark 130 on the upper control arm 10 or lower control arm 12 and orientation mark 132 on insert 122 can be modified after first determining the amount of camber and/or caster angle correction required using standard geometric calculation. The amount of camber an/or caster angle needed will determine the azimuth orientation of insert 122 and hence the entire apparatus. Once the correction is known, orientation mark 132 is aligned, with a template or some other means, relative to orientation mark 130 and insert 122 is pressed into upper arm control 10 or lower control arm 12. Bolt 126 is set to the proper position in insert slot 128 and tightened to maintain the setting.

Accordingly, it can be seen that the adjustable camber apparatus 120 will restore the factory specified camber and/or caster angle to the tire and wheel or set the camber and/or caster angle to another desired value, while utilizing a minimal amount of space. The adjustable camber apparatus could be installed so as to affect caster angle only or a combination of camber and caster angle.

What is claimed is:

1. Apparatus for selective positioning of a vehicle ball joint securable between a control arm and a wheel mounting, said apparatus comprising:

a module configured to secure an end of the ball joint and including a threaded bore thereat and an orientation guide at one surface thereof;

an insert securable at the control arm and having a mating orientation guide structure at one surface thereof engageable at said orientation guide of said module for rotationally stabilizing said module thereat, said insert having a slot therethrough; and a threaded stud mountable through said slot of said insert and engageable by said threaded bore of said module, said stud movable linearly at said slot of said insert.

2. The apparatus of claim 1 wherein said module has a cavity defined in said one surface thereof for receiving the end of the ball joint, said cavity having a seating rim thereat adjacent to a module opening through which the ball joint extends.

3. The apparatus of claim 2 wherein said module includes a cover having a portion of said orientation guide thereat, said cover receivable over said cavity.

4. The apparatus of claim 1 wherein said orientation guide includes first and second linear slots.

5. The apparatus of claim 4 wherein said mating orientation guide structure are protrusions.

6. The apparatus of claim 1 wherein said insert includes a flange and a rim, said rim secured through an opening in the control arm so that said flange rests at one side of said control arm.

7. Apparatus mountable at a vehicle control arm opening and at a spindle to provide selectable camber correction of a vehicle wheel comprising:

an insert having a slot, said insert extendible through the control arm opening and having an orientation guide structure at one surface thereof;

a ball joint retaining module including a body and a cover, one surface of said body and said cover defining an orientation guide receivable at said orientation guide structure of said insert, said body having a cavity therein through said one surface that is secured by said cover;

a ball joint affixable at one end to the spindle and at another end in said cavity in said body of said module; and a stud engageable at a selected position through said slot of said insert with said ball joint retaining module.

8. The apparatus of claim 7 wherein said body of said module includes a threaded bore, said stud having matable threads and engageable at said threaded bore.

9. The apparatus of claim 8 wherein said threaded bore and said cavity are adjacent to one another at said one surface of said body of said module.

10. The apparatus of claim 8 wherein said cavity and said threaded bore overlap.

11. The apparatus of claim 7 wherein said orientation guide includes spaced substantially parallel slots.

12. The apparatus of claim 11 wherein said orientation guide structure at said insert includes pins pressed into openings at said one surface of said insert.

13. Apparatus providing camber angle adjustability of a vehicle wheel comprising:

an insert having protruding guides and an elongated slot therethrough;

a ball joint module including a ball joint, a body with a threaded bore adjacent to a cavity, and a cover, at least said cover having guide slots thereat; and a bolt engageable through said slot of said insert and at said threaded bore of said body of said module;

wherein said insert is held at a vehicle suspension control arm member with a selected alignment of said slot relative to the control arm member, said ball joint is fitted into said cavity of said body of said module with said cover secured thereover at said body, said guide slots of said cover of said module and said protruding guides of said insert are aligned, and said bolt is located at a selected location linearly in said elongated slot of said insert before being tightened in said threaded bore.

14. The apparatus of claim 13 wherein said insert includes an orientation mark for selected alignment of said slot of said insert with the vehicle suspension control arm member.

15. The apparatus of claim 13 wherein said ball joint module is linearly movable relative to said insert with said protruding guides in said guide slots.

16. The apparatus of claim 13 wherein said guide slots extend to a surface of said body adjacent to said cover, said guide slots rotationally stabilizing said ball joint module.

17. The apparatus of claim 13 wherein said threaded bore and said cavity overlap, and wherein said body of said module includes a ball joint seating rim annularly defined at said cavity.

* * * * *